US009032686B2

(12) United States Patent
Speidel et al.

(10) Patent No.: US 9,032,686 B2
(45) Date of Patent: May 19, 2015

(54) SURFACE COVERING KIT COMPRISING PANELS AND AN EXTRANEOUS LOCKING ELEMENT

(75) Inventors: Hannes Speidel, Neftenbach (CH); Eddy Boucke, Menen (BE)

(73) Assignee: I-TeCONSULT N.V., Kortrijk (BE)

( * ) Notice: Subject to any disclaimer, the term of this patent is extended or adjusted under 35 U.S.C. 154(b) by 0 days.

(21) Appl. No.: 14/111,830

(22) PCT Filed: Apr. 15, 2011

(86) PCT No.: PCT/EP2011/001911
§ 371 (c)(1), (2), (4) Date: Oct. 15, 2013

(87) PCT Pub. No.: WO2012/139601
PCT Pub. Date: Oct. 18, 2012

(65) Prior Publication Data

US 2014/0041332 A1 Feb. 13, 2014

(51) Int. Cl.
*E04B 2/00* (2006.01)
*E04F 13/08* (2006.01)
(Continued)

(52) U.S. Cl.
CPC ............. *E04F 13/0894* (2013.01); *E04F 13/08* (2013.01); *E04F 15/02* (2013.01); *E04F 2201/0153* (2013.01); *E04F 2201/0169* (2013.01); *E04F 2201/0529* (2013.01);
(Continued)

(58) Field of Classification Search
CPC ................ E04F 2201/0153; E04F 2201/0523; E04F 2201/0511; E04F 2201/0541; E04F 2201/093; E04F 13/0894; E04F 2201/05
USPC ............. 52/588.1, 582.1, 586.2, 591.5, 592.2
See application file for complete search history.

(56) References Cited

U.S. PATENT DOCUMENTS 3,416,275 A 12/1968 Van Loghem, et al.
4,052,832 A 10/1977 Jungers et al.
(Continued)

FOREIGN PATENT DOCUMENTS

DE 72 07 395 U 7/1972
DE 100 44 016 A1 3/2002
(Continued)

OTHER PUBLICATIONS

International Search Report of PCT/EP2011/001911 dated Jan. 2, 2012.

(Continued)

*Primary Examiner* — Brian Glessner
*Assistant Examiner* — Paola Agudelo
(74) *Attorney, Agent, or Firm* — Sughrue Mion, PLLC

(57) ABSTRACT

A surface covering kit is disclosed, comprising a plurality of generally rectangular panels (100). Each panel is provided with grooves (301, 302, 301', 302') forming an insertion channel (303) when two panels (100) are laid next to each other along their transverse sides (105, 105') in a common laying plane (101). An extraneous locking element (210) is received by the insertion channel (303), the extraneous locking element (210) having a longitudinal dimension and a cross-section perpendicular to said longitudinal dimension which forms a cross with at least four cross arms. The corresponding cross arms of the insertion channel have two parallel flank surfaces (1603, 1604) each, and each of the cross arms is oriented diagonally in a plane perpendicular to the panel plane (102).

19 Claims, 7 Drawing Sheets

(51) Int. Cl.
*E04F 15/02* (2006.01)
*F16B 5/00* (2006.01)

(52) U.S. Cl.
CPC ... *E04F2201/0541* (2013.01); *E04F 2201/057* (2013.01); *E04F 2201/0576* (2013.01); *E04F 2201/0582* (2013.01); *F16B 5/0052* (2013.01); *F16B 5/0012* (2013.01); *F16B 5/008* (2013.01)

(56) References Cited

U.S. PATENT DOCUMENTS

| | | | | |
|---|---|---|---|---|
| 7,806,624 | B2 * | 10/2010 | McLean et al. | 404/47 |
| 2008/0134613 | A1 | 6/2008 | Pervan | |
| 2008/0134614 | A1 * | 6/2008 | Pervan et al. | 52/588.1 |
| 2010/0319291 | A1 * | 12/2010 | Pervan et al. | 52/588.1 |
| 2011/0091678 | A1 * | 4/2011 | Plante | 428/58 |
| 2013/0283719 | A1 | 10/2013 | Dohring et al. | |

FOREIGN PATENT DOCUMENTS

| | | | |
|---|---|---|---|
| DE | 200 21 780 | U1 | 5/2002 |
| EP | 1 361 319 | A1 | 11/2003 |
| EP | 1 367 194 | A2 | 12/2003 |
| EP | 1 119 670 | B1 | 8/2005 |
| WO | 01/51732 | A1 | 7/2001 |
| WO | 03/016654 | A1 | 2/2003 |
| WO | 03/083234 | A1 | 10/2003 |
| WO | WO 03095761 | A1 * | 11/2003 |
| WO | 2007/079845 | A1 | 7/2007 |

OTHER PUBLICATIONS

Communication dated Jan. 20, 2015, issued by the Russian Intellectual Property Office in counterpart Russian application No. 2013149350.

* cited by examiner

SURFACE COVERING KIT COMPRISING PANELS AND AN EXTRANEOUS LOCKING ELEMENT

CROSS REFERENCE TO RELATED APPLICATIONS

This is a National Stage of International Application No. PCT/EP2011/001911 filed Apr. 15, 2011, the content of all of which is incorporated herein by reference in its entirety.

TECHNICAL FIELD

The present invention relates to a surface covering, in particular to a floor, ceiling or wall covering, comprising panels, including laminate flooring panels, and an extraneous locking element.

PRIOR ART

A variety of different kinds of surface coverings, in particular floor, ceiling or wall coverings are known in the art. In particular for interior applications, rectangular panels sometimes having the appearance of wood boards or ceramic tiles are quite common.

Such panels are often provided on one side with a decor for example to reproduce the appearance of a real wood panel. This decor can be provided either as a printed paper layer or a veneer, or the decor can be directly printed onto the carrier board. Often, these panels are of rectangular shape and can be coupled to each other using complementary coupling means which commonly are formed as integral parts at the panel sides. Thus, similar panels can be connected at corresponding adjacent sides to form, for example, a floor covering. Among these coupling means in particular various kinds of tongue and groove based coupling means are known which allow for form fitting connections between similar panels by introducing the tongue of one panel into the groove of another panel. To lock the panels together in horizontal and vertical directions, the coupling means are further provided with suitable locking elements, which allow the panels to be firmly locked to each other. Thereby it is possible that such tongue and groove coupling means with additional locking elements can lock respective coupled panels perpendicular to their common connection joint as well as perpendicular and parallel to the panel plane without the need of additional locking means such as glue or nails.

In the case of rectangular panels, it is common that panels are provided with two different kinds of coupling means, one for the longitudinal sides and one for the transversal sides. This is often necessary because connection means that work well on a relatively short side (e.g. the transversal side of flooring panels) do not necessarily work well on distinctly longer sides (e.g. the longitudinal sides of flooring panels) and vice versa.

For example, two opposing longitudinal sides of such panels can be provided with tongue and groove coupling means, which allow similar panels to be connected to each other at adjacent longitudinal sides by angling. Angling in this sense means introducing the tongue into the groove and then laying the panel by a rotational (angling) movement into the laying plane. Often with such systems, the transverse opposing sides of these panels can be provided with coupling means which allow similar panels to be connectable to each other at adjacent transverse sides by vertical folding. Folding in this sense means that the transversal locking means are joined into each other (folded down) by the rotational, scissor-like movement caused by angling around the longitudinal side. This combination of coupling means allows that a panel can be connected to a row of similar panels by angling this panel along corresponding longitudinal adjacent panel sides, while within the same working step this panel is connected to neighboring panels by vertical folding to corresponding adjacent transverse panel sides. Such panel systems are generally called “angling” and/or “fold down systems”.

An example of such a fold down system is described in WO 01/51732. This document describes angling with a tongue- and groove system on a longitudinal side plus additional tongue and groove coupling means on the transverse sides which include hook-shaped coupling members. Upon folding down of panels at corresponding transverse sides, a transverse tongue of one panel is inserted into a corresponding groove of another panel by the angling motion. To increase the stability of this connection, WO’732 discloses to insert an extraneous locking element into a channel, which is formed by the transverse coupling means. To form this channel, a recess is provided in the transverse tongue which in coupled condition, when two panels are connected to each other, opposes a corresponding recess provided in an adjacent transverse groove. After coupling two panels, the extraneous locking element is inserted into this channel to lock the two panels in a direction perpendicular to their transverse sides and perpendicular to the panel plane.

Similar coupling mechanisms in which extraneous locking elements are used to lock the transverse sides of panels with each other are e.g. WO 2003/016654 and WO 2007/079845. All these solutions have in common that they utilize relatively complex geometries at the transverse sides. Such geometries with many different surfaces are difficult to machine and require several milling tools and milling passes. These solutions use additional tongue and groove systems or hook-like measures on the transverse side to eliminate relative horizontal movement and an extraneous locking element being inserted into grooves on the transverse side to eliminate vertical and rotational movement.

It is very expensive to maintain milling tools for such complicated profiles with many surfaces over time because the necessary tight tolerances can not be met if the milling tools wear over time. Constant maintenance and replacement of tools as well as the stopping of production facilities for maintenance is cost intensive.

Above this, in order to mill such profiles on the transverse sides, a portion of the material of a panel is milled away and thus lost if it cannot readily be recycled. In the case of most wood based materials (such as MDF, HDF, chip boards and OSB boards) not only the wooden material is lost, but often also components of a chemical binder (resin or the like) are milled to a potentially hazardous and flammable fine dust which may be difficult and costly to dispose of.

Another disadvantage of such prior art is that such complicated profiles cannot be employed on relatively thin panels. With such a tongue- and groove system on the transversal sides, a long and thin lever is left at the short ends of panels, which is easily damaged or broken off during transportation and during installation.

A further disadvantage of the above prior art is that such profiles demand some amount of overlapping of two panels on the transverse side. While this overlapping portion may seem to be only a small percentage of the overall surface of a panel, it is a waste which translates directly into higher costs for customers.

A locking system which overcomes some of these defects is disclosed in DE10044016. In DE’016, a dovetail shaped groove together with an insertable locking element is disclosed. Additionally DE'016 also discloses that it is useful for two panels to directly touch only in an upper region, leaving a gap below such an upper region.

A basic problem which arises from connections with dovetail like grooves such as in DE'016, is that they require undercuts. Such undercuts are difficult to mill and again require a set of several different milling tools and techniques with a set of different corresponding cutting surfaces which must be aligned relative to each other and thus the tools need to be maintained regularly in order to keep tolerances. A relatively high amount of defective products may also be a further consequence of such complex profiles. As with the other prior art further above, they are relatively complex and expensive to produce.

A further disadvantage of DE'016 is that the disclosed dovetail shaped connecting element may be difficult to insert into its groove due to friction. While the amount of friction on a relatively short transverse side of a panel may not pose a problem to manual insertion, the amount of friction on a standard length flooring panel (1300 mm) renders the dovetail shaped connecting element of DE'016 unusable on longitudinal sides of standard flooring panels.

Another disadvantage from DE'016 arises when a large load (such as heavy furniture) is placed on one panel next to another panel which carries no load at all. Due to the elasticity of the panels and the often elastic underground (a sound insulation layer, for example), a strong rotational force may be applied to the dovetail shaped connecting element. The shape and the dimensions of the dovetailed connecting element of DE'016 are not well suited to efficiently counteract such rotational forces.

EP 1119670 generally discloses connection profiles with undercuts and hook shaped elements. Such profiles may be achieved by broaching or by laser cutting according to EP'670, two methods known to be tedious, slow and expensive. The only profile mentioned in EP'670 which could be achieved by traditional methods such as milling, is not well suited for reliable connections. It cannot accommodate large separative forces, neither in horizontal, vertical, nor in rotational directions.

SUMMARY OF THE INVENTION

It is an object of the present invention to improve the state of the art by providing simple, reliable, durable and cheap coupling means which are easily manufactured and especially well suited for thin panel geometries.

This and other objects which become apparent upon reading the following description, are solved by a surface covering kit according to claim 1.

According to the present invention, a surface covering, for example a flooring, ceiling or wall covering, is provided, comprising panels and at least one extraneous locking element. Generally, such panels can be made of any material such as wood or wood based material, veneer, natural or synthetic fibrous material, metal, metallic alloys, plastic, foams, ceramics, rubber or the like or also of any layered materials. The invention is especially well suited for panels made of HDF, MDF, OSB, chip boards and panels which are made of wood, wood based materials and laminate. The panels can be provided with a decor, as for example a real wood imitation, a stone imitation or a ceramic imitation, in form of a separate decor paper or the decor may alternatively be directly printed onto the panels.

In the case of laminate flooring where the decorative layer is provided as a paper, further layers are normally added above and below the core. Usually at least one more layer known as overlay will be added on top of the decorative layer to obtain better wear resistance.

Each panel is provided with parallel, opposing longitudinal sides and parallel, opposing transverse sides, whereby these sides are provided with respective longitudinal and transverse coupling means, which preferably are formed as integral components of the panel sides and which serve for connecting similar panels at their corresponding adjacent sides.

The present invention offers a simple, reliable and very stable connection by providing grooves on each transverse side to be connected, the grooves forming an insertion channel when two panels are laid next to each other along their transverse sides in a common laying plane, and by providing at least one extraneous locking element adapted to be received by said insertion channel along an insertion direction in parallel to the transverse side to lock two adjacent panels to each other relative to a first direction parallel to their common laying plane and perpendicular to the transverse sides as well as relative to a second direction perpendicular to their common laying plane. The extraneous locking element has a longitudinal dimension and a cross-section perpendicular to said longitudinal dimension which substantially forms a cross with at least four cross arms. Each cross arm has two substantially parallel flank surfaces each. The grooves are oriented in such a manner that each of the cross arms is oriented diagonally between said first and said second directions when said extraneous locking element is received by said insertion channel.

The term "diagonally between said first and said second directions" is to be understood to relate to a configuration in which each arm extends at an angle relative to each of these directions, wherein this angle is between 15° and 75°, preferably between 30° and 60°.

The cross-shaped cross-section of the extraneous locking element geometrically provides just enough surfaces to resist attacking forces onto the connection from all possible directions, except of course in parallel to the direction of insertion of the extraneous locking element. The latter however is highly desirable because then two such connected panels can later be disassembled and separated again by pulling them apart by exerting opposing forces in parallel to the insertion direction between two panels. The extraneous locking element can then be similarly removed from the channel by again exerting opposing forces in parallel to the insertion direction between the panel and the locking element.

The cross-shape of the cross-section is chosen because it is the simplest geometry which can reliably oppose forces in all desired directions, both horizontal and vertical. Additionally, the cross-shape of the cross-section of the extraneous locking element is very well suited to oppose rotational forces which occur if a large load is placed on one panel next to another panel without load (for example a furniture load). A cross-shape of the cross-section of the extraneous locking element with four arms and preferably with two substantially parallel flank surfaces on each of the arms has more surfaces efficiently opposing a rotational movement than a similarly dimensioned dovetail-shaped cross-section would have. Since the cross-arms of the cross-shape of the present invention are essentially diagonally opposed to each other, they provide optimum stability, using a minimal geometrical footprint at the same time.

A cross-shape of the-cross section of the extraneous locking element with two substantially parallel flank surfaces per arm is preferably chosen because it is exceptionally easy to mill channels receiving such a locking element precisely by rotating milling or sawing wheels with equally parallel surfaces. The free end or tip of each cross arm can be another flat surface or a rounded surface or the like. The arms of the cross each point away from the cross center, so that all cross arms lie in planes which are oriented diagonally between the laying plane and the transversal sides.

The cross-shape of the cross-section of the extraneous locking element also provides resistance against bending, both during insertion of the extraneous locking element and also after installation, when differential loads might be applied to the panels.

In a preferred embodiment, the cross-section of the insertion channel is also cross-shaped. In this case, each transverse side of the panels is provided with two grooves which are generally in parallel to the transverse side, but essentially lie in two planes which are inclined towards each other. When two panels which are to be connected are laid next to each other, the then four grooves form a channel with a cross-shaped cross-section. Such channels are exceptionally easy to manufacture, while optimal interaction between the insertion channel and the locking element can be ensured.

Because the locking means according to the present invention are intended to work well with very thin panel geometries, the cross-shape of the cross-section of the extraneous locking element and/or of the insertion channel is preferably chosen to be somewhat broader along the first direction than high along the second direction (i.e., the cross appears somewhat flattened, the angles between each cross arm and its two neighbors being somewhat different, with a difference of, e.g., 10°-60°). This geometrical compromise results in a connection which is still very reliable against especially horizontal parting forces, but does not unnecessarily thin the panel material above and below the insertion channel with the cross-shaped cross-section. This is essential to make the grooves more stable against fracture and thus the panels more resistant to the tearing out of the extraneous locking elements out of their respective grooves.

Since a careful balance between locking stability and insertion friction of the extraneous locking element must be found, measures to reduce friction upon manual insertion will also be presented for preferred embodiments.

The terms “longitudinal” and “transverse” as used herein do not include any limitations with regard to the relative lengths of both sides but are merely used in order to differentiate the different sides of the panel for the sake of a facilitated description. Thus, while usually the longitudinal side is the longer side of a panel and the transversal side is the shorter side, the extraneous locking element of the present invention can of course also be used in connection with the longer side of a panel or with panels in which longitudinal and transverse sides have the same length, i.e. with square panels.

In this sense, the locking element with the cross-shaped cross-section according to the present invention can be used both on the long and on the short sides. However, since the friction during insertion of the locking element can become excessively large for long panels such as standard 1300 mm length flooring panels, the locking element according to the present invention is preferably used on the short sides in combination with an angling profile on the long sides.

It is advantageous for the locking stability that all angles between the cross arms of the cross-shaped cross-section of the insertion channel (and correspondingly of the extraneous locking element) are larger than 30, and preferably larger than 45 degrees.

It is advantageous for the ease of insertion of the locking element and for the locking stability, if the aspect ratio of the total length between the tips (free ends) of two diagonally opposed cross arms divided by the width of the cross arms is smaller than 10 and preferably smaller than 8, but larger than 2 and preferably larger than 2.5.

The cross-shaped cross-section of the insertion channel (and thus also of the extraneous locking element) will generally have a double plane symmetry by being symmetric about a first plane parallel to the transversal side and about a second plane parallel to the panel plane; however, asymmetric cross shapes are conceivable as well.

It is advantageous for the stability of the insertion channel if a minimal thickness ($h_{min}$) of panel material between the insertion channel and an upper or lower panel surface is not smaller than one tenth, and preferably not smaller than one eighth of the overall thickness of a panel.

It is advantageous for the ease of insertion of the extraneous locking element that the locking element has between one and four friction reducing grooves near the center of the cross. These grooves each mainly extend in parallel to the longitudinal dimension of the extraneous locking element and each groove is located in a region where adjacent cross arms of the extraneous locking element meet. The cross-section of these grooves extend partially inward from the flank surfaces towards the cross center and can have any arbitrary form such as being V- or U shaped, but generally round and partial-circle shaped cross sections are preferred.

It is advantageous for the ease of insertion of the extraneous locking element that at least one of the cross arms of the extraneous locking element has wavelike protrusions and grooves on its outer surfaces. The wavelike protrusions and grooves extend in parallel to the longitudinal dimension of the extraneous locking element.

It is advantageous for the ease of insertion of the extraneous locking element that at least one of the four cross arms of the extraneous locking element is split by a surface which extends in parallel to the longitudinal dimension of the extraneous locking element and inward partially from the tip of a cross arm towards the center of the cross.

It is advantageous for the stability of the locking, if those two cross arms which extend towards the upper surface of a panel are upper arms and those two cross arms which extend towards the lower surface of a panel are lower arms, when the extraneous locking element is inserted into the insertion channel, an elastic pretension is applied to the connection by pre-bending the upper arms of the extraneous locking element upwardly and the lower arms downwardly relative to the corresponding cross arms of the insertion channel. This pre-bending can be achieved either by applying an angle between the two upper and/or between the two lower cross arms of the extraneous locking element which is slightly smaller (preferably by less than 20°, more preferably by less than 10°) than the corresponding angles between the upper and the lower cross arms of the insertion channel; and/or by applying a small amount of upwardly respectively downwardly bending curvature on the cross arms of the extraneous locking element.

It is advantageous for the ease of insertion of the extraneous locking element that at least one of the cross arms of the extraneous locking element is interrupted along its longitudinal dimension by one or more gaps. These gaps can have any arbitrary length, number and depth, but preferably the gaps are provided in regular intervals on all arms and extend only partially inwards from the tips of the cross arms towards the center of the cross and most preferably extend only half way inwards from the tips of the cross arms towards the center of the cross.

For some material pairings and geometries, it can be advantageous if the total length of the extraneous locking element is shorter or even significantly shorter than the total length of the transversal side. For laminate flooring panels however, a total length of the extraneous locking element which is nearly equal to the total length of the transversal side is preferred.

It is advantageous for the ease of insertion of the extraneous locking element that the ends (tips) of the locking element are rounded or beveled or even that the locking element conically grows thinner towards its ends.

It is advantageous for the ease of insertion of the extraneous locking element and also to accommodate mild expansion and contraction of the panels, to provide a compensation groove mainly extending in parallel to and in between the transversal sides with two substantially parallel flanks. This compensation groove is provided between two adjacent panels on their transversal side, such that a lower part of the groove extends all the way between the center of the cross of the insertion channel and the lower panel surface; and an upper part of the groove extends from the center of the cross of the insertion channel upwards only partially towards the upper panel surface.

It is advantageous for the ease of insertion of the extraneous locking element, if one or two lateral friction reducing grooves are provided on one or two of the transversal sides of the panels. These lateral grooves mainly extend in a direction in parallel to the transversal sides of the panels and in the panel plane. If the insertion channel has a cross-shaped cross section, each friction reducing groove preferably extends outward from the center of the cross of the insertion channel only partially towards a surface between the tips of the arms of the insertion channel, i.e. it does not extend outward from the center of the cross of the insertion channel all the way towards the surface between the tips of the arms of the insertion channel, so that sufficient resistance of the locking against rotational forces is still maintained.

It is advantageous for the laying of the panels, if each panel is provided with at least one protruding lip on one transversal side below the insertion channel on the lower panel side, and each panel is also provided with at least one corresponding recess on the opposing other transversal side below the insertion channel and the lower panel side such that a laying aid is formed when the recess is laid onto the protruding lip. This laying aid is intended to align the two halves of the insertion channel so that the locking element can easily be inserted. For simplicity, the laying aid is preferably provided on the whole length of the transversal side, but alternatively it can also be provided partially or only near one or two of the ends of the transversal side. The laying aid may also be provided in the form of a thin plastic strip attached to the panel below one transversal side. No recess is necessary in conjunction with such a plastic strip.

It can be advantageous for the resistance against rotational forces for some material pairings and geometries, if the extraneous locking element has a cross-section with six cross arms instead of only four cross arms. For material pairings however in which the grooves of the insertion channel tend to break or tear easily, such as in thin MDF, HDF or LDF laminate flooring, four cross arms are preferred.

It can be advantageous for the person inserting the locking elements that the extraneous locking element has portions of the two upper arms of the cross marked in some manner or colored in a distinctly different color than the two lower arms. This helps to prevent faulty insertions by wrongly rotating the extraneous locking element before insertion.

Since it can be difficult to insert extraneous locking elements which are very long, it is advantageous if each panel additionally has a profile with a tongue on one longitudinal side and a groove on the opposed longitudinal side. This groove preferably has an upper lip and a lower lip, the lower lip having an upwardly extending locking protrusion and the tongue being adapted to be introduced into the groove, thus enabling an adjacent panel to be angled down on the longitudinal side, so that locking of the longitudinal side is achieved in parallel to their common laying plane by the upper lip and the lower lip and perpendicular to the longitudinal side by the locking protrusion. In other words, an angling profile and system can further be provided on the longitudinal sides.

It is advantageous for the locking stability if the extraneous locking element has a first tip at one of its ends which is dimensioned to partially fit into the corresponding groove on a longitudinal side of a previously laid panel element. Such a tip has to be dimensioned in such a way that it can be maneuvered through the cross-shaped cross-section of the insertion channel, past the locking protrusion and into the longitudinal groove and under its upper lip, thereby providing locking stability at a triple panel junction.

It is advantageous for the locking stability, if the extraneous locking element has a second tip on the end of the locking element opposed to the first tip and this second tip forms the same groove as the longitudinal profile with an upper lip and a lower lip and a locking protrusion. This enables that the tongue of a panel on the longitudinal side can also be introduced into the portion of the longitudinal groove which is partially formed by the second tip of the extraneous locking element when element is inserted into the insertion channel.

A corresponding laying method for a surface covering comprises:

(a) providing a surface covering kit as described above;

(b) laying a first row of panels by laying the panels of the first row side by side along their transverse sides in a common laying plane;

(c) inserting an extraneous locking element into each insertion channel along the insertion direction to lock each pair of adjacent panels to each other relative to the first direction and the second direction;

(d) providing a second row of panels parallel to the first row, wherein each panel of the second row is preferably connected to the first row by angling;

(e) inserting an extraneous locking element into each insertion channel along the insertion direction to lock each pair of adjacent panels of the second row to each other relative to the first and second directions; and (f) repeating steps (c) to (e) for each further row of panels.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
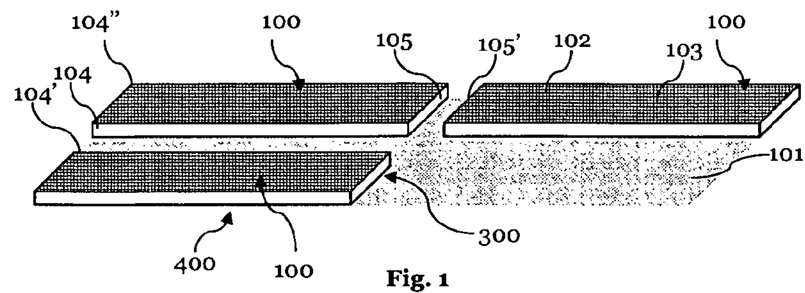
FIG. 1 shows the laying and the relative positions of panels according to the present invention in a perspective view.

FIG. 1 is a schematic illustration showing three exemplary panels 100 laid in a common plane 101. These panels 100 can be made of any suitable material, however the invention is especially well suited for laminate panels made from HDF, MDF or LDF. The panels 100 can also be made of a wood composite, real wood, veneer, chip boards or OSB. The panels 100 have a mean or average thickness in between 3 mm and 30 mm and most preferably in between 4 mm and 14 mm. Since the connecting elements on the transverse sides according to the present invention have such a simple geometry, they are exceptionally well suited for very thin panels, such as 5 mm flooring laminate.

A decor 103 can either be provided as a separate decor layer, e.g. a decor printed on paper, or can be directly printed onto the panels 100. The decor 103 can be for example: a real wood imitation, a stone imitation, a ceramic imitation or the like.

As one can see in FIG. 1, each panel 100 defines a panel plane 102 and is provided with parallel, opposing longitudinal sides 104, 104' and parallel, opposing transverse sides 105, 105'. These sides are provided with respective transverse and longitudinal coupling means 400, 300 which are adapted to connect similar panels 100 at corresponding adjacent sides 104, 104' and 105, 105', respectively.

Figure 2:
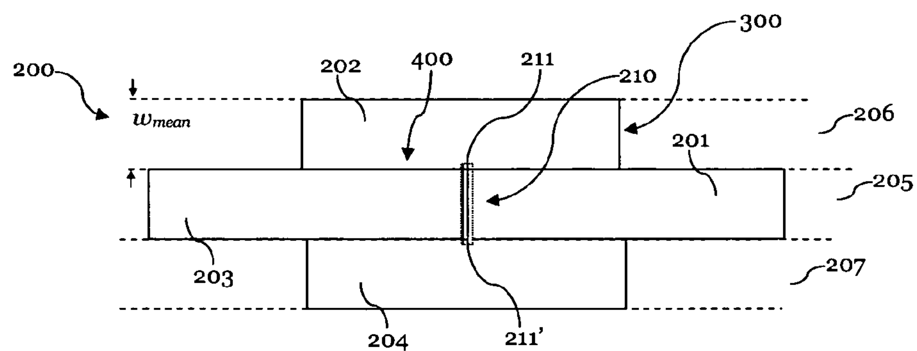
FIG. 2 shows the laying and the relative positions of panels according to the present invention in a view perpendicular to the laying plane.

FIG. 2 is a schematic illustration showing a surface covering 200 comprising panels 201, 202, 203 and 204 and an extraneous locking element indicated at reference numeral 210. It should be noted that in the figure, the extraneous locking element is only drawn for illustrative purposes, while in reality it is covered by the top surface of the panels, and would therefore be invisible in the shown perspective. In FIG. 2, two panels 201, 203 of a first row 205 are connected to each other at adjacent transverse sides. The panels 201 and 203 are connected longitudinally with a further panel 202 in a second row 206 and with a further panel 204 in a third row 207. As one can derive from FIG. 2, the extraneous locking element is inserted into a channel (the channel is shown in detail in FIGS. 6, 7, 8, 15 and 16) formed by the transversal coupling means of panels 201 and 203, whereby an end portion 211 of the extraneous locking element 210 in a preferred embodiment can protrude on one end to some extent out of said channel and into the groove of the longitudinal coupling means of the panel 202 in the second row 206. Alternatively or additionally, the opposite end 211' of the extraneous locking element 210 can protrude a little bit out of the other end of the channel. This will be illustrated further in FIGS. 17-21.

The locking element 210 can be made of any suitable material with a favorable friction coefficient, such as plastic, PTFE, aluminum alloys, steel or even wood or wood based materials.

Figure 3:
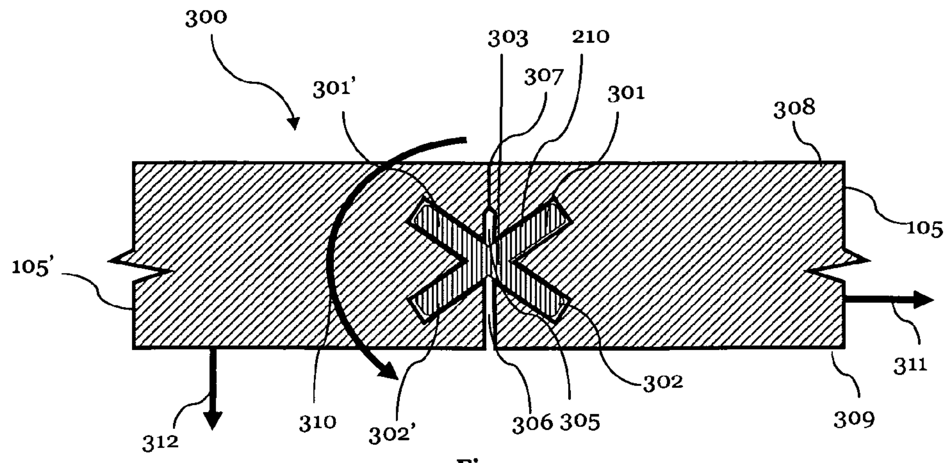
FIG. 3 shows the cross section of a transversal connection according to the present invention.

FIG. 3 shows a cross section of the transverse coupling means 300. A transverse side 105 is provided with two geometrically simple grooves 301 and 302 along the transversal side. An opposing transverse side 105' is equally provided with the same grooves 301' and 302'. All together, the four transversal grooves 301, 302, 301' and 302' form an insertion channel 303 which has an cross-shaped cross section on the whole length of the transversal sides 105 and 105'.

Once two transversal sides 105 and 105' are laid in parallel and next to each other and in the same common laying plane, an extraneous locking element 210 is inserted into the corresponding channel 303, whereby the panels are locked perpendicular to transversal panel sides 105, 105' and perpendicular to the common laying plane 101. It is emphasized that no undercuts or additional profile surfaces or additional transversal coupling means are necessary to achieve this locking. Furthermore, an inward, respectively downward bending along transversal sides 105 of the panel surface is prevented by the locking element 210.

In the embodiment of FIG. 3, compensation grooves are machined above 305 and below 306 the insertion channel 303 into the panels. These grooves serve two purposes: they can help to accommodate some mild contraction and expansion since the panels only have contact on a small surface 307, and additionally the grooves 305 and 306 significantly reduce friction when the extraneous locking element 210 is inserted.

FIG. 3 also shows forces attacking perpendicular to the transversal sides 311 and perpendicular to the common laying plane 312. A strong load on one panel may result in rotational forces 310. The surfaces of the extraneous locking element 210 and the corresponding channel 303 are well suited to counteract such rotational forces, no additional surfaces or undercuts are therefore necessary.

The extraneous locking element 210 shown in FIG. 3 thus provides excellent mechanical locking properties. However, it may be difficult to manually insert this locking element into its corresponding insertion channel 303 during assembly of panels with large dimensions because friction increases with the length of the locking element. For this reason, the locking element of the present invention is preferably employed on the short sides, while an “angling” system with a tongue-and groove locking system is preferably employed on long sides. The length of the extraneous locking element 210 according to the present invention may be any arbitrary length, ranging from anywhere between 1 cm up to the overall dimension (including the locking means) of a transversal side. In preferred embodiments however, the length of the extraneous locking element is nearly equal to the overall dimension (including the locking means) of a transversal side.

Figure 4:
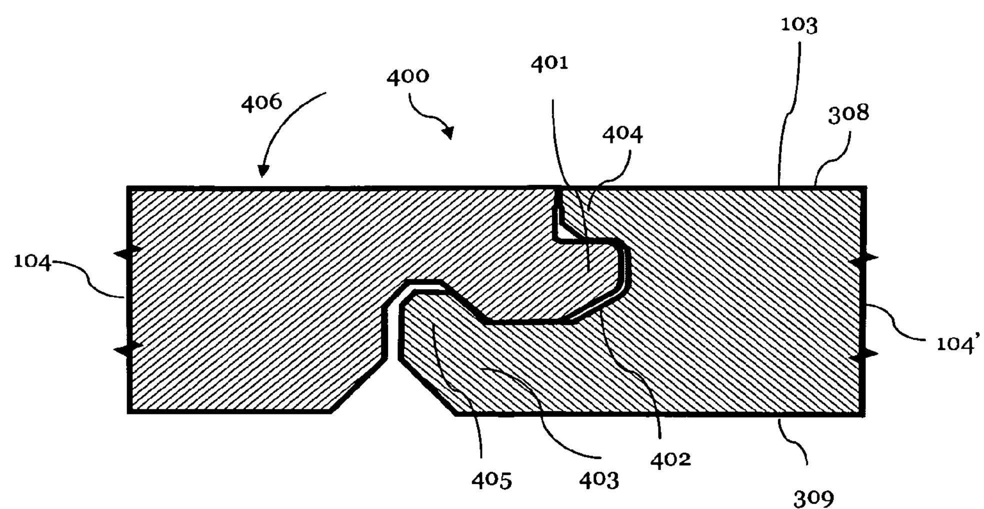
FIG. 4 exemplarily shows the cross section of a longitudinal connection of a preferred embodiment.

FIG. 4 exemplarily shows preferred coupling means 400 on a longitudinal side 104. These coupling means comprise a tongue 401 on one longitudinal side 104 and a corresponding longitudinal groove 402 on a opposing longitudinal side 104'. The longitudinal groove 402 comprises a lower lip 403 which is arranged close to a bottom side 309 of a panel 100 and an upper lip 404 which is arranged close to the upper side 308 of a panel which carries for example the visible decor 103. As one can see, and this arrangement is preferred with any kind of longitudinal coupling means used in connection with the present invention, the lower lip 403 is longer than the upper lip 404 and the lower lip 403 is provided with a locking protrusion 405 at its free end which extends upwardly from the lower lip 403 to be inserted into a corresponding recess.

It can be recognized from FIG. 4, that these coupling means can be closed by moving the tongue 401 into the groove 402 at an angle, and by subsequent rotation along arrow 406. After this rotation (angling), the locking element 405 fixes the mechanism such that the corresponding panels are locked perpendicular to adjacent longitudinal sides 104 and perpendicular to the laying plane as well as in parallel to the laying plane.

Figure 5:
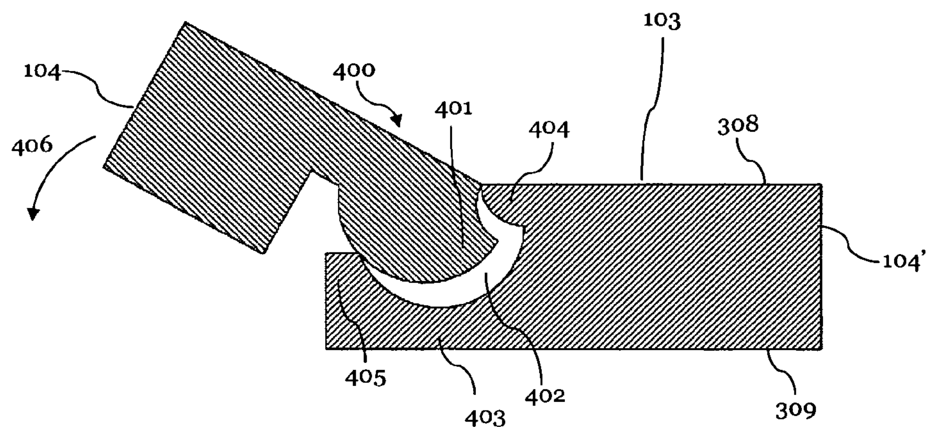
FIG. 5 exemplarily shows the cross section of a longitudinal connection of a different preferred embodiment.

FIG. 5 exemplarily shows a variation of these principles and elements for longitudinal coupling means 400 known as such from prior art (CH562377), the difference being here that more generally rounded surfaces are used.

Figure 6:
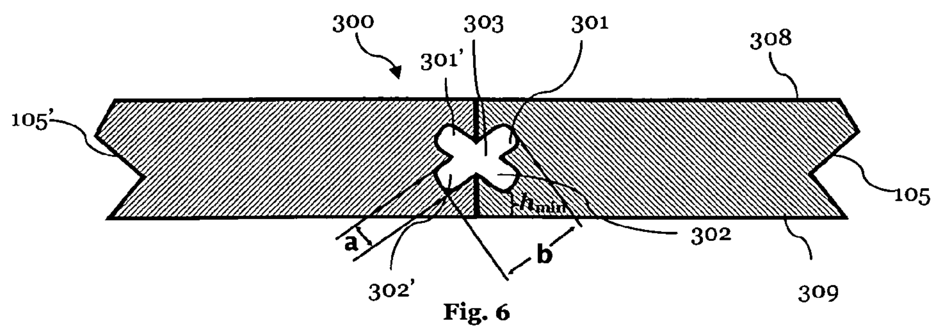
FIG. 6 shows a cross section of a transversal connection according to the present invention.

FIG. 6 shows a preferred cross section of the transverse coupling means 300 with relative dimensions suitable for 6 mm laminate flooring panels. For clarity, the extraneous locking element 210 is left out of its channel 303 in this figure. In this embodiment, the gaps 305 and 306 of FIG. 3 are not present. As can be deducted from this figure, the locking elements 300 on the transversal side of panels according to the present invention are especially well suited for thin panels due to their simple geometry. A minimal thickness of panel material $h_{min}$ must be left between the upper transversal channel groove 301 and the panel surface as well as between the lower transversal channel groove 302 and the panel surface, so that the panel will not break along the transversal grooves 301 or 302 when large loads are applied. The thickness $h_{min}$ depends on the material of the panels, the thickness of the panels and the forces to be expected (e.g. surface loads such as furniture or the like). In this drawing, the height $h_{min}$ is in proportion for typical 6 mm laminate.

Preferably the minimal thickness $h_{min}$ of the panel material above and below the transversal insertion channel 303 shall be greater than one tenth of the panel thickness and preferably greater than one eighth of the panel thickness.

In FIG. 6, the length of a double arm of the cross in the cross-shaped cross section of the insertion channel 303 is indicated by the letter b, while its width is indicated by the letter a. The aspect ratio of b divided by a governs the relative surface of the insertion channel and the extraneous locking element and thereby also the friction upon insertion.

Preferably the aspect ratios for b divided by a are smaller than 10 and preferably smaller than 8. The aspect ratio of b divided by a also governs the ability of the extraneous locking element to resist rotational forces. This is why b divided by a should preferably not be smaller than 2 and preferably not smaller than 2.5.

An additional measure to reduce friction upon insertion of the extraneous locking element 210 is to eliminate contact surfaces between the insertion channel 303 and the extraneous locking element 210 in those places that do not sacrifice too much connection stability. This is a task of the upper and lower transversal gaps 305 and 306 in FIG. 3.

FIG. 6 also shows relative dimensions which have proven to be advantageous for 6 mm laminate flooring with an MDF or an HDF core: The length b of the double cross arm is 4.6 mm, the width of a cross arm a is 1.4 mm and the height $h_{min}$ is 1.3 mm. Minimal heights of $h_{min}$ smaller than 0.5 mm have proven to be unpractical for wood based materials.

Figure 7:
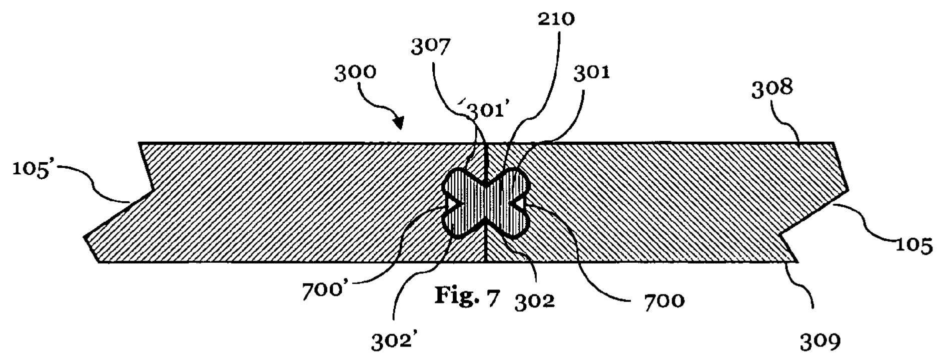
FIG. 7 shows a cross section of a transversal connection of a preferred embodiment of the present invention.

FIG. 7 shows additional means to reduce friction upon insertion of a preferred embodiment by eliminating some of the contact surface between the upper and the lower transversal grooves 301 and 302. This is done by providing an additional lateral groove 700. The depth of the lateral groove 700 is chosen to be smaller than the minimal distance between transversal panel surface 307 and the tips of the arms of the cross in the cross-shaped cross-section of the insertion channel 303, so that the extraneous locking element still provides enough resistance against rotational forces because the ends of the arms are still locked.

Figure 8:
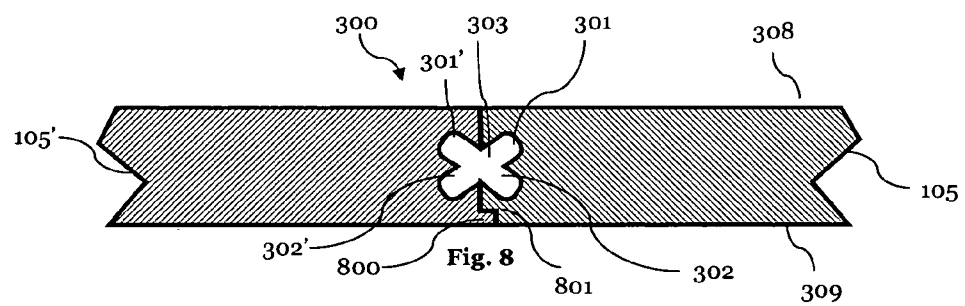
FIG. 8 shows a cross section of a transversal connection of a preferred embodiment of the present invention with a laying aid.

FIG. 8 shows a preferred embodiment of the transversal coupling means 300 where a lip 800 and a recess 801 have been added in order to provide an alignment and laying aid when laying the panels on a slightly irregular or elastic underground. The protruding lip 800 is located on one transversal side 105' between the insertion channel 303 and the lower panel side 309, the corresponding recess 801 is located on the opposing transversal side 105. This laying aid makes it easier to insert the extraneous locking element 210 into the thereby aligned channel 303.

Figure 9:
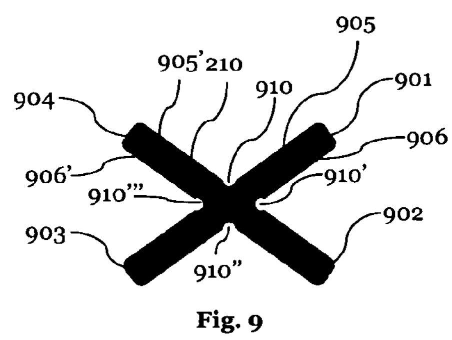
FIG. 9 shows a preferred embodiment of the cross-shaped cross-section of the extraneous locking element according to the present invention

FIG. 9 shows a preferred embodiment of the cross-shaped cross-section of the extraneous locking element 210 according to the present invention. Up to four friction reducing grooves 910, 910', 910" and 910'" are added near the center of the cross in the region where adjacent cross arms 901, 902, 903 and 904 meet.

Figure 10:
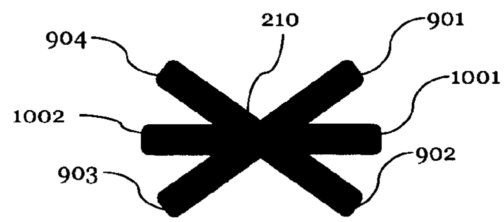
FIG. 10 shows a less preferred embodiment of the cross-shaped cross-section of the extraneous locking element according to the present invention with two additional arms.

FIG. 10 shows another embodiment of the cross-shaped cross-section of the extraneous locking element 210 according to the present invention. In this embodiment, two additional arms 1001 and 1002 have been added to the cross-shaped cross-section of the extraneous locking element 210. While these additional two arms contribute additional resistance to rotational forces, they do not contribute to resistance against horizontal forces. Especially in the case of thin panels, they might thin the panel material between the arms (for example between the arms 901 and 1001). This thinning may assist the rupture of the transversal channel grooves under severe loading conditions. Furthermore, the two additional grooves 1001 and 1002 must be milled at additional cost. Therefore, the embodiment of FIG. 10 may be less preferred.

Figure 11:
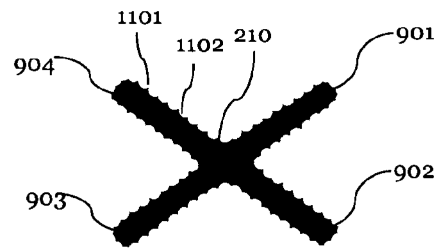
FIG. 11 shows a preferred embodiment of the cross-shaped cross-section of the extraneous locking element according to the present invention with wave-like grooves and protrusions.

FIG. 11 shows a further preferred embodiment of the cross-shaped cross-section of the extraneous locking element 210. In this embodiment, wave shaped protrusions 1101 and grooves 1102 have been added along the outline of the cross-shaped cross-section of the extraneous locking element 210. These protrusions, which may also be developed as teeth with an outwardly facing locking direction, significantly add locking stability without adding friction.

Figure 12:
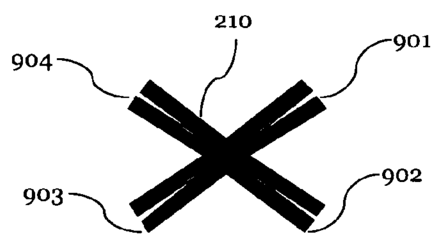
FIG. 12 shows a preferred embodiment of the cross-shaped cross-section of the extraneous locking element according to the present invention with split arms.

FIG. 12 shows a further preferred embodiment of the cross-shaped cross-section of the extraneous locking element 210. In this embodiment, one or more of the arms of the cross-shaped cross-section of the extraneous locking element 210 are split by a surface which extends in parallel to the longitudinal dimension of the extraneous locking element 210 and inward partially from the tip of a cross arm 901, 902, 903, 904 towards the center of the cross. This splitting serves the purpose of providing elastic compressibility of the arms of the cross of the extraneous locking element during insertion and thus reduces friction.

Figure 13:
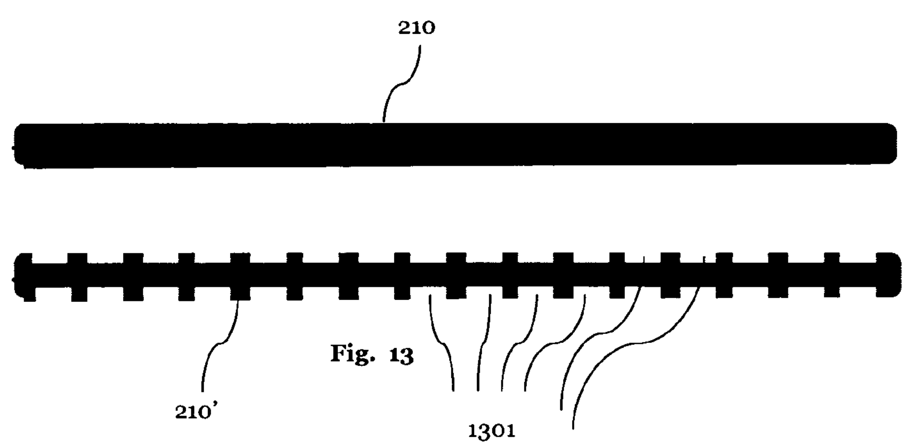
FIG. 13 shows two embodiments of the extraneous locking element according to the present invention in a lateral view

FIG. 13 shows two lateral views of preferred embodiments of extraneous locking elements 210 and 210' according to the present invention. In the upper embodiment 210, the arms of the cross are fully developed over the whole length of the extraneous locking element. In the lower embodiment 210, portions 1301 of the arms are left out at intervals in order to reduce friction upon insertion.

Especially with wood based materials, debris in the form of dust is often left by a milling process. Grooves such as 305, 306, 700, 910, 1301 as well as the splitting shown in FIG. 12 serve the double friction reducing purpose of reducing the contact surface between the transversal insertion channel 303 and the extraneous locking element 210 and additionally also to accommodate some amount of milling debris (such as saw dust) so that said debris does not have to be pushed all along the whole length of the insertion channel 303 and thereby be accumulated at the tip of the locking element 210 during insertion.

Figure 14:
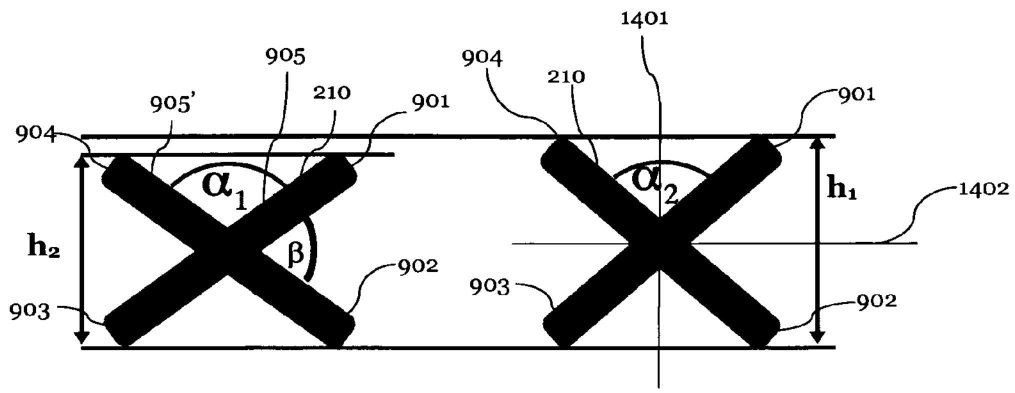
FIG. 14 shows design principles of the cross-shaped cross-section of the extraneous locking element according to the present invention.

FIG. 14 illustrates some design principles of the cross-shaped cross-section of the extraneous locking element 210.

Left side: in order to obtain small and simple geometries, it is advantageous to choose an angle $\alpha_1$ which extends between two flank surfaces 905, 905' of the upper arms 904 and 901 of the cross, so that $\alpha_1$ is slightly larger than 90 degrees. This helps to maintain a minimal thickness $h_{min}$ as described in FIG. 6 because the overall height of the locking element is reduced ($h_2<h_1$) without sacrificing too much locking stability. Preferred embodiments of the present invention comprise an angle $\alpha_1$ larger than 90 degrees and more preferably larger than 100 degrees but not larger than 150 degrees. This enables the extraneous locking element 210 to be smaller in its vertical dimension than in its horizontal dimension. If the angle $\alpha_1$ is chosen to be larger than 150 degrees (or accordingly the complementary angle is $\beta$ thus chosen to be smaller than 30 degrees), the arms 901, 902 of the cross-section of the locking element 210 are not well suited to resist paring forces perpendicular to the transversal sides 105, 105' any more.

Right side: If the grooves in the transversal insertion channel 301 and 301' are machined under an angle $\alpha_1$ and a slightly smaller angle $\alpha_2$ is chosen between the upper arms of the cross in the cross-shaped cross-section of the extraneous locking elements 210 (i.e. between the arms 901 and 904), an elastic pretension pulling two transversal sides towards each other can be obtained. However, this pretension often comes at the cost of increased friction. This is why the angle $\alpha_1$ between the transversal channel grooves should not be larger than the angle $\alpha_2$ by more than 20 degrees and more preferably by no more than 10 degrees between the upper arms of the extraneous locking element (before installation) in preferred embodiments.

This figure also shows that the cross-shaped cross section of the extraneous locking element 210 is preferably symmetrical in both a vertical plane 1401 and in a horizontal plane 1402. This makes the manufacturing of the insertion channel 303 and the extraneous locking element 210 exceptionally easy and also error safe against wrong insertion during installation.

Figure 15:
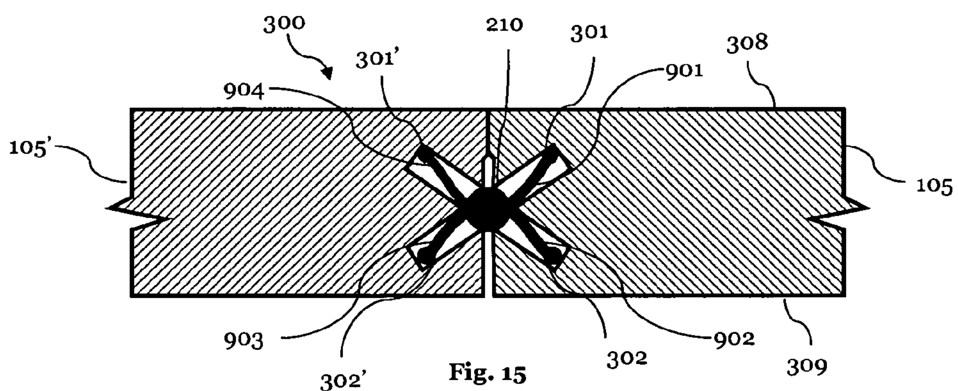
FIG. 15 shows a less preferred embodiment of the cross-shaped cross-section of the extraneous locking element according to the present invention.

FIG. 15 shows a less preferred embodiment of the extraneous locking element wherein the locking is not achieved by a tight geometrical fit of the arms 901, 902, 903 and 904 into their respective channels 301, 302, 302' and 301', but rather totally by elastic pretension. For this type of locking element, steel or preferably even spring steel is chosen as material.

Figure 16:
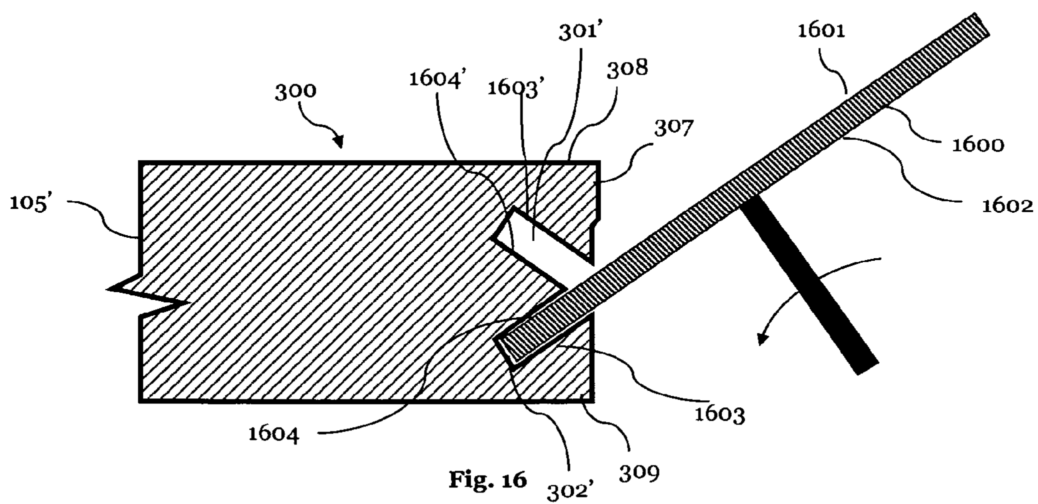
FIG. 16 exemplarily shows a principle of milling the grooves of the cross-shaped cross-section of the insertion channel according to the present invention.

FIG. 16 shows in principle how the transversal channel grooves 301 and 302 respectively 301' and 302' can easily and rapidly be cut by a rotating milling- or sawing wheel 1600. Here only one cutting wheel for the channel 302' is shown. Such cutting wheels may be operated at very high cutting speeds and at low costs. The transversal insertion channel grooves 301 and 302 are essentially cut homogeneously all along the transversal sides 105.

Since the surfaces 1601 and 1602 of such low cost and high speed cutting wheels are essentially parallel to each other, it follows that the lateral flanks of each of the transversal insertion channel grooves such as 1603 and 1604 of the groove 302' and 1603' and 1604' of the groove 301' are also essentially parallel to each other.

When tongue-and groove angling systems are chosen for the longitudinal connection means 400 of panels of the present invention, the ends 211 and 211' of the extraneous locking elements 210 may be adapted in a way that they usefully strengthen the connection between three or even four panels at the same time.

Figure 17:
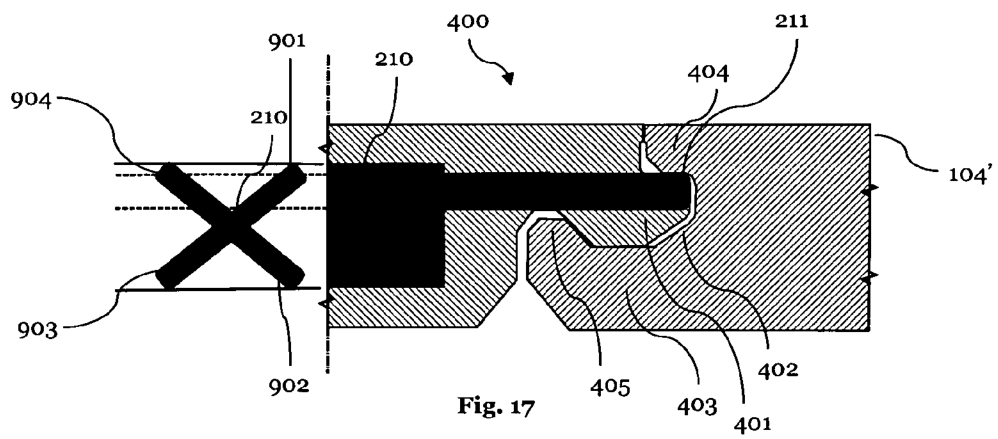
FIG. 17 shows the tip of the extraneous locking element of a preferred embodiment.

FIG. 17 exemplarily shows the adaption of a tip 211 of the extraneous transversal locking element 210 according to the present invention when it is used in conjunction with a longitudinal tongue- and groove angling system.

On the right hand side of the vertical dashed line, a cut in parallel to the transverse side of a panel is shown. The cut in this figure runs through the triple point where two panels on their transverse side join a panel on the longitudinal side. In this embodiment of the present invention, the geometry of the groove on the longitudinal side has been chosen so that a thinned extension of the tip 211 of the extraneous locking element 210 can be inserted past the locking protrusion 405 under the upper lip 404 to fit into the groove 402. This gives additional mechanical locking strength at the triple point junction of three panels which allows for an exceptionally stable connection at the triple junctions. It is emphasized that no alterations are made to the transversal insertion channel 303 or to the cross-shaped cross-section of the extraneous locking element. Only the tip 211 has been modified and thinned to fit into the longitudinal groove 402.

On the left hand side of the vertically dashed line, the extraneous locking element 210 is shown in profile in order to demonstrate which regions of the profile are thinned and extended to reach into the groove 402 of the longitudinal side.

A further advantage of this embodiment is that the tip 211 now has a distinguishable "upper side" where it is thinned and elongated. This is very helpful because now the person installing the cross-shaped locking element 210 cannot easily mistakenly rotate the locking element by 90, by 180 or by 270 degrees. In other words, the person installing the cross-shaped locking element 210 can easily determine how to correctly fit in the extraneous locking element.

In order to enhance this further, portions of the two upper arms 901 and 904 of the cross of the cross-shaped cross section of the extraneous locking element 210 may additionally be colored in a distinctly different color than the lower arms 902 and 903.

Figure 18:
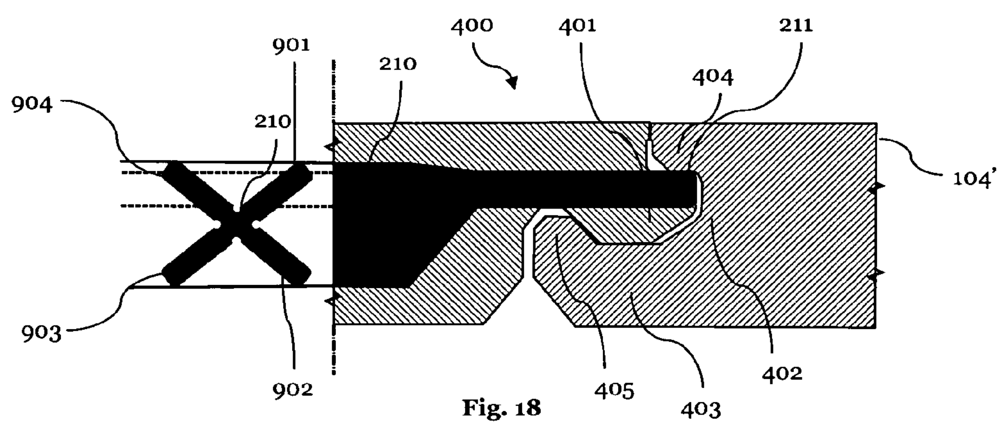
FIG. 18 shows the tip of the extraneous locking element of a preferred embodiment.

FIG. 18 shows the same perspectives and features as in FIG. 17, however here right angles have been avoided in the region where the tip of the extraneous locking element 210 is thinned out to protrude into the longitudinal groove. The avoidance of sharp or right angles gives additional stability to the tip 211 of the locking element 210.

Figure 19:
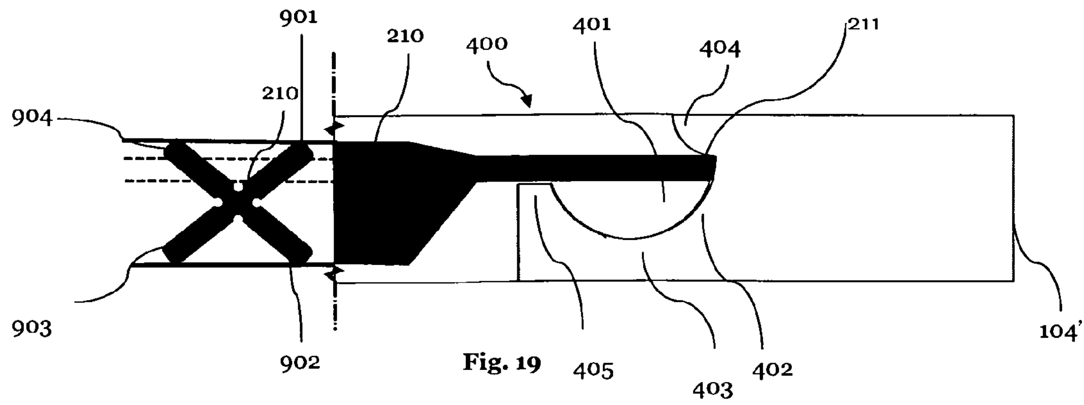
FIG. 19 shows the tip of the extraneous locking element of a preferred embodiment.

FIG. 19 shows the same perspectives and features as in FIGS. 17 and 18 but with a different tongue and groove profile on the longitudinal side with more curved surfaces. Essential to both longitudinal profiles in FIGS. 17, 18 and 19 is that there is a gap between the locking protrusion 405 and the upper lip 404 through which an extended tip 211 of the extraneous locking element 210 can be inserted.

Figure 20:
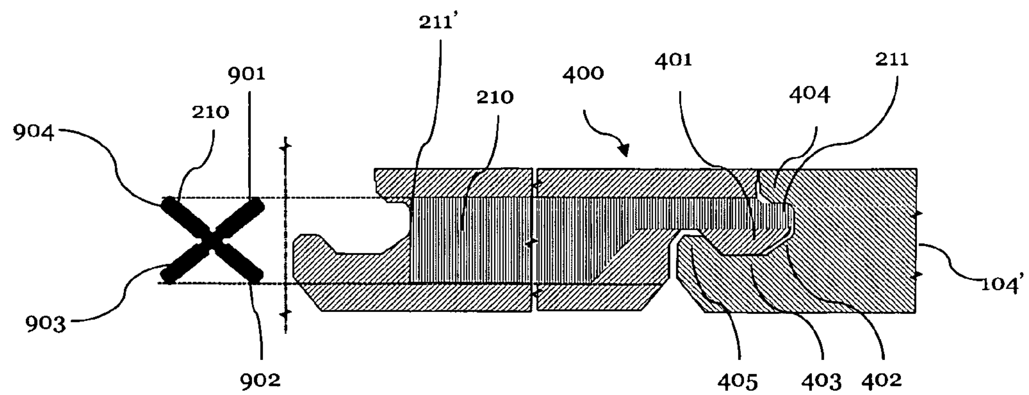
FIG. 20 shows both ends of the extraneous locking element of a preferred embodiment for a locking of three panels.

FIG. 20 shows the same perspective and features as in FIGS. 17, 18 and 19 but here the other end of the transversal locking element 211' is also shown. In this embodiment, the tip 211 of the locking element 210 is developed to fit into the groove 402 at a triple junction, while the other end 211' of the locking element is left blunt. This embodiment of the extraneous locking element locks three panels simultaneously.

Figure 21:
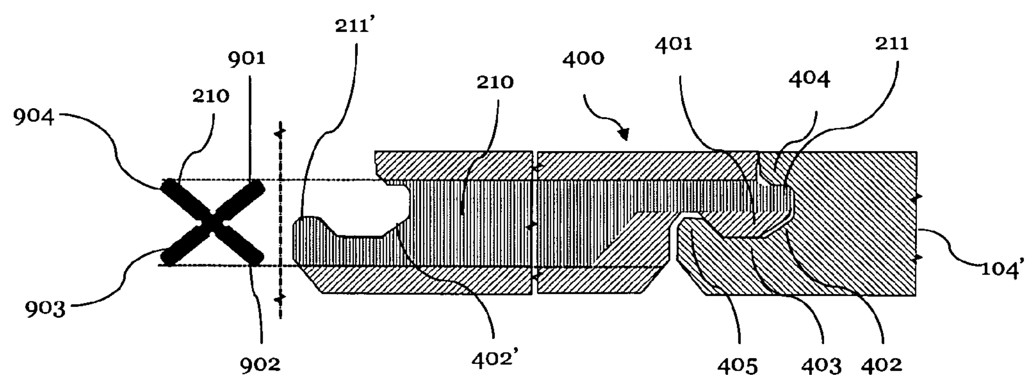
FIG. 21 shows both ends of the extraneous locking element of a preferred embodiment for a locking of four panels.

FIG. 21 shows the same perspective and features as in FIG. 20, but now the end tip 211' of the extraneous locking element has been given the same profile as the longitudinal groove 402'. A locking element with these tips 211 and 211' can contribute to the locking of four boards across three rows 207, 205 and 206 as shown in FIG. 2. It follows logically from FIG. 21 that extraneous locking elements of this type of embodiment have an overall length which is equal to the overall transversal width of a panel, including its tongue and the groove.

The groove-shaped slot 402' at the end 211' of the extraneous locking element 210 additionally provides an ideal guide into which a blunt tool such as a screwdriver tip or a spatula or also a custom made insertion tool may be inserted in order aid the manual insertion of the extraneous locking element.

Figure 22:
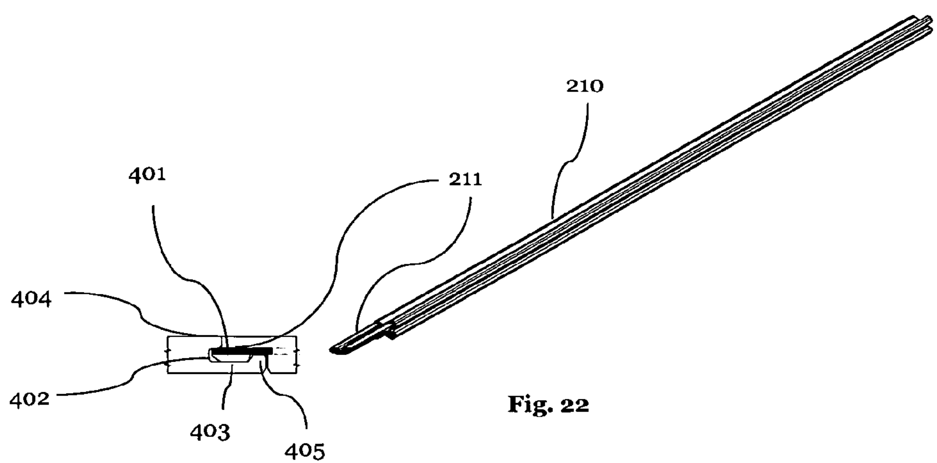
FIG. 22 shows a perspective view of the extraneous locking element together with a cut though preferred longitudinal locking means.

FIG. 22 shows the same features as in FIG. 17, but now a perspective view of the locking element 210 and its tip 211 have been added.

LIST OF REFERENCE SIGNS

100 Panels
101 Laying plane
102 Panel plane
103 Decor
104 Longitudinal sides
105 Transversal sides
200 Surface covering
201 First panel
202 Second panel
203 Third panel
204 Fourth panel
205 First panel row
206 Second panel row
207 Third panel row
210 Extraneous locking element
211 End portion of extraneous locking element
300 Transversal coupling means
301 Upper transversal insertion channel groove
302 Lower transversal insertion channel groove
303 Transversal insertion channel
305 Upper compensation groove
306 Lower compensation groove
307 Transversal panel contact surface
308 Upper panel surface
309 Lower panel surface
310 Rotational forces
311 Forces perpendicular to the transversal sides
312 Forces perpendicular to the common laying plane
400 Exemplary longitudinal coupling means
401 Longitudinal tongue
402 Longitudinal groove
403 Lower lip
404 Upper lip
405 Locking protrusion
406 Angling direction
700 Lateral friction reducing groove
800 Protruding lip of laying aid
801 Recess of laying aid
901 First arm of the cross of the cross-shaped cross-section of the locking element
902 Second arm of the cross of the cross-shaped cross-section of the locking element
903 Third arm of the cross of the cross-shaped cross-section of the locking element
904 Fourth arm of the cross of the cross-shaped cross section of the locking element
905 First parallel flank surface of a cross arm
906 Second parallel flank surface of a cross arm
910 Friction reducing groove
1001 Additional fifth arm of the locking element
1002 Additional sixth arm of the locking element
1101 Wave-shaped protrusions
1102 Wave-shaped grooves
1301 Gaps
1401 Vertical symmetry plane
1402 Horizontal symmetry plane
1600 Cutting wheel
1601 Upper surface of cutting wheel
1602 lower surface of cutting wheel
1603 Flank of transversal insertion channel groove
1604 Flank of transversal insertion channel groove

The invention claimed is:

1. A surface covering kit, comprising:

a plurality of generally rectangular panels, each panel defining a panel plane and each panel having an upper and a lower panel surface in parallel to the panel plane, two parallel, opposing longitudinal sides and two parallel, opposing transverse sides, the transverse sides being provided with grooves adapted to form an insertion channel when two panels are laid next to each other along their transverse sides in a common laying plane; and at least one extraneous locking element adapted to be received by said insertion channel along an insertion direction in parallel to the transverse side to lock two adjacent panels to each other relative to a first direction parallel to their common laying plane and perpendicular to the transverse sides as well as relative to a second direction perpendicular to their common laying plane, the extraneous locking element having a longitudinal dimension and a cross-section perpendicular to said longitudinal dimension which substantially forms a cross with at least four cross arms, wherein said grooves are oriented in such a manner that each of the cross arms is oriented diagonally between said first and said second directions when said extraneous locking element is received by said insertion channel, and wherein a compensation groove extending substantially in parallel to the transverse sides with two substantially parallel flanks is provided between the two adjacent panels when said panels are laid next to each other along their transverse sides in a common laying plane, such that a lower part of the groove extends all the way from the insertion channel to the lower panel surface, and an upper part of the groove extends from the insertion channel upwards at most partially towards the upper panel surface, the two adjacent panels making contact only at a contact surface near the upper surface, said contact surface being perpendicular to the laying plane, being aligned with the compensation groove, and being arranged immediately adjacent to the compensation groove.

2. A surface covering kit according to claim 1, wherein each transverse side of the panels is provided with two grooves which are substantially parallel to the transverse side and inclined diagonally between said first and said second directions, the grooves being adapted to form an insertion channel with a cross-shaped cross section when two panels are laid next to each other along their transverse sides in a common laying plane, said grooves having two substantially parallel flank surfaces each.

3. A surface covering kit according to claim 1, wherein the cross-shaped cross-section of the extraneous locking element is smaller in its dimension along said second direction than in its dimension along said first direction.

4. A surface covering kit according to claim 1, wherein all angles between the arms of the extraneous locking element are larger than 30 degrees.

5. A surface covering kit according to claim 1, wherein two diagonally opposed cross arms of the extraneous locking element have a total diagonal length of b from one tip of a cross arm to the tip of a diagonally opposed cross arm and the cross arms each have a thickness of a, wherein the aspect ratio of b divided by a is smaller than 10, but larger than 2.

6. A surface covering kit according to claim 1, wherein said panels have a minimal thickness of panel material between the insertion channel and a panel surface which is not smaller than one tenth, and preferably not smaller than one eighth of the overall thickness of a panel.

7. A surface covering kit according to claim 1, wherein the extraneous locking element has at least one friction reducing groove extending in parallel to the longitudinal dimension of the extraneous locking element, wherein each friction reducing groove is located in a region where adjacent cross arms of the extraneous locking element meet.

8. A surface covering kit according to claim 1, wherein at least one of the four cross arms of the extraneous locking element has wavelike protrusions and grooves extending in parallel to the longitudinal dimension of the extraneous locking element on its outer surface.

9. A surface covering kit according to claim 1, wherein at least one of the four cross arms of the extraneous locking element is split by a surface which extends in parallel to the longitudinal dimension of the extraneous locking element and inward partially from the tip of a cross arm towards the center of the cross.

10. A surface covering kit according to claim 1, wherein two of the cross arms extend towards the upper surface of the two panels between which the insertion channel is formed, and two of the cross arms extend towards the lower surface of the two panels between which the insertion channel is formed when the extraneous locking element is inserted into the insertion channel, wherein the cross-arms that extend towards the upper surface are pre-bent upwardly, and wherein the cross-arms that extend towards the lower surface of the panel are pre-bent downwardly, so as to apply an elastic pretension to said two panels.

11. A surface covering kit according to claim 1, wherein at least one of the cross arms of the extraneous locking element is interrupted along its longitudinal dimension by one or more gaps.

12. A surface covering kit according to claim 1, wherein one or two lateral friction reducing grooves are provided on one or two of the transversal sides of the panels, each lateral groove extending substantially in a direction in parallel to the transversal sides and outward from the center of the insertion channel in the panel plane.

13. A surface covering kit according to claim 1, wherein each panel is provided with a protruding lip on one transversal side between the insertion channel and the lower panel side and said panel is also provided with a corresponding recess on the opposing other transversal side between the insertion channel and the lower panel side such that a laying aid is formed.

14. A surface covering kit according to claim 1, wherein the extraneous locking element has portions of the two upper arms of the cross colored in a distinctly different color than the two lower arms.

15. A surface covering kit according to claim 1, wherein each panel additionally has a profile with a tongue on one longitudinal side and a groove on an opposed longitudinal side, said groove having an upper lip and a lower lip, said lower lip having an upwardly extending locking protrusion, said tongue being adapted to be introduced into said groove enabling an adjacent panel to be angled down on the longitudinal side so that locking of the longitudinal side is achieved in parallel to their common laying plane by the upper lip and the lower lip and perpendicular to the longitudinal side by the locking protrusion.

16. A surface covering kit according to claim 15, wherein the extraneous locking element has a first tip at one of its ends, the tip being dimensioned to partially fit into a corresponding groove on a longitudinal side of a panel element and said tip being maneuverable during insertion of the extraneous locking element past the locking protrusion and into said groove under the upper lip.

17. A surface covering kit according to claim 15, wherein the extraneous locking element has a second tip at one of its ends, said second tip forming a substantially identical groove as said profile, with an upper lip and a lower lip and a locking protrusion, thereby enabling the tongue of a panel to also be introduced into the groove which is formed by the tip of the extraneous locking element when said locking element is inserted into the insertion channel.

18. A surface covering kit, comprising:

a plurality of generally rectangular panels, each panel defining a panel plane and each panel having an upper and a lower panel surface in parallel to the panel plane, two parallel, opposing longitudinal sides and two parallel, opposing transverse sides, the transverse sides being provided with grooves adapted to form an insertion channel when two panels are laid next to each other along their transverse sides in a common laying plane; and at least one extraneous locking element adapted to be received by said insertion channel along an insertion direction in parallel to the transverse side to lock two adjacent panels to each other relative to a first direction parallel to their common laying plane and perpendicular to the transverse sides as well as relative to a second direction perpendicular to their common laying plane, the extraneous locking element having a longitudinal dimension and a cross-section perpendicular to said longitudinal dimension which substantially forms a cross with at least four cross arms, wherein said grooves are oriented in such a manner that each of the cross arms is oriented diagonally between said first and said second directions when said extraneous locking element is received by said insertion channel, and wherein at least one of the four cross arms of the extraneous locking element is split by a surface which extends in parallel to the longitudinal dimension of the extraneous locking element and inward partially from the tip of a cross arm towards the center of the cross.

19. A surface covering kit, comprising:

a plurality of generally rectangular panels, each panel defining a panel plane and each panel having an upper and a lower panel surface in parallel to the panel plane, two parallel, opposing longitudinal sides and two parallel, opposing transverse sides, the transverse sides being provided with grooves adapted to form an insertion channel when two panels are laid next to each other along their transverse sides in a common laying plane; and at least one extraneous locking element adapted to be received by said insertion channel along an insertion direction in parallel to the transverse side to lock two adjacent panels to each other relative to a first direction parallel to their common laying plane and perpendicular to the transverse sides as well as relative to a second direction perpendicular to their common laying plane, the extraneous locking element having a longitudinal dimension and a cross-section perpendicular to said longitudinal dimension which substantially forms a cross with at least four cross arms, wherein said grooves are oriented in such a manner that each of the cross arms is oriented diagonally between said first and said second directions when said extraneous locking element is received by said insertion channel, and wherein the extraneous locking element has at least one friction reducing groove extending in parallel to the longitudinal dimension of the extraneous locking element, wherein each friction reducing groove is located in a region where adjacent cross arms of the extraneous locking element meet.

* * * * *